United States Patent
Wang

(10) Patent No.: US 12,476,954 B2
(45) Date of Patent: Nov. 18, 2025

(54) UNIVERSAL PRIVILEGED ACCESS FOR WEB APPLICATIONS THROUGH REMOTE BROWSER ISOLATION

(71) Applicant: Splashtop Inc, Cupertino, CA (US)

(72) Inventor: Yanlin Wang, Cupertino, CA (US)

(73) Assignee: Splashtop Inc., Cupertino, CA (US)

( * ) Notice: Subject to any disclaimer, the term of this patent is extended or adjusted under 35 U.S.C. 154(b) by 148 days.

(21) Appl. No.: 18/600,480

(22) Filed: Mar. 8, 2024

(65) Prior Publication Data

US 2025/0286876 A1    Sep. 11, 2025

(51) Int. Cl.
*H04L 29/06*    (2006.01)
*H04L 9/40*    (2022.01)

(52) U.S. Cl.
CPC ........ *H04L 63/0815* (2013.01); *H04L 63/083* (2013.01); *H04L 63/20* (2013.01)

(58) Field of Classification Search
CPC .... H04L 63/0815; H04L 63/083; H04L 63/20
See application file for complete search history.

(56) References Cited

U.S. PATENT DOCUMENTS

2022/0103556 A1*  3/2022  Boliek ............... H04L 63/10

FOREIGN PATENT DOCUMENTS

WO    WO-2025029497 A1 *  2/2025  ......... H04L 63/083

* cited by examiner

*Primary Examiner* — Tri M Tran
(74) *Attorney, Agent, or Firm* — Wei Wu

(57) ABSTRACT

Methods and systems of providing a universal privileged access management solution to enable users to securely share web applications through remote browser isolation (RBI). The web applications may be hosted in a SAAS (Software As A Services) cloud or in a private network. For privileged access of web applications that do not support SSO, the universal privileged access management solution implements cloud-based software services including Remote Browser Isolation (RBI), Zero Trust Network Access (ZTNA) and password vault. For privileged access of web applications that support SSO, the universal privileged access management solution implements cloud-based software services including Remote Browser Isolation (RBI) and ID brokers. In the access authentication process, by leveraging the data loss prevention (DLP) feature of RBI, the actual access credentials for accessing web applications are not disclosed to the user for mitigating security risks.

8 Claims, 2 Drawing Sheets

UNIVERSAL PRIVILEGED ACCESS FOR WEB APPLICATIONS THROUGH REMOTE BROWSER ISOLATION

FIELD OF THE DISCLOSURE

This disclosure relates generally to Internet security and, more particularly, to methods and systems of providing universal privileged access for web applications through remote browser isolation (RBI). The web applications may be hosted in a Software As A Service (SAAS) cloud or in a private network.

BACKGROUND

An enterprise may provide access to users to a number of applications for various purposes such as product development, business analytics, and human resources management, and so on. Nowadays it is typical that some of these applications are hosted by the enterprise on its private networks, while other applications are hosted by application providers via SAAS cloud infrastructure and services.

These disparately hosted applications provide challenges as these disparate systems may not share passwords and authentication systems. IT administrators have to provision separate access control configurations and policies for identity and access management. This increases the IT administration expense and management of passwords and authentication to these different systems.

Single Sign-On (SSO) solutions mitigate the issue by enabling users to securely authenticate with multiple applications by using just one set of access credentials. However, this requires a trust relationship established between a service provider and an identity provider such as OneLogin and Google Sign-in. And many of the enterprise applications may not have integration with SSO solutions. Therefore, a user has to sign up for individual accounts to use such enterprise applications that do not support SSO.

With the wide availability of cloud computing infrastructure and services such as Amazon Web Services (AWS), Microsoft Office 365, and Salesforce, many of the enterprise applications (or web applications) can be accessed via web browsers.

It is a common scenario that a user may need to share the access of a web application to a third party. For example, one needs help on configuring settings or installing certain software libraries for a web application. The web application may be hosted in a SAAS cloud or a remote private network. Typically, a third-party may need to connect remotely to the user's computer and gain access to the user's web application. However, with existing remote desktop sharing solutions like VNC, a user has to give the whole computer's access right to the IT staff. This is not desirable as the user only wants to share the access to a specific web application only.

Implementing a secure remote privileged access solution for third-party and privileged access to web applications as described in above example scenario presents some challenges:

1. Regardless of whether the web application is SSO-enabled, IT administrators must provision access entitlements in the identity management system. These accounts, being privileged, can access critical digital assets or may be provisioned to third parties whom IT administrators have less trust in. In such cases, IT administrators need to protect these privileged accounts with special security measures. Traditionally, this involves (i) password checkout from a vault with an appropriate workflow, (ii) password rotation after use, and (iii) combined with session control and management. However, the traditional approaches introduce risks as the credentials for the privileged account are disclosed to the users.
2. The targets of privileged access such as web applications are often critical digital assets. Implementing privileged and third-party access to these web applications while preventing critical data leakage is challenging. Measures need to be in place to prevent data leakage operations by users such as downloading files from the web applications and copying and pasting contents from their browser, and also ensure that potential malware on a user's endpoint or risky browser extensions are not able to access critical data for possible leakage.
3. Given the critical nature of the data that privileged accounts can access, IT must implement security measures to monitor user behavior in real-time and intervene when necessary. Additionally, IT needs to implement an audit trail for compliance and forensics purposes.

SUMMARY OF THE INVENTION

Embodiments of the invention implement a universal privileged access management solution to enable users to securely share web applications through Remote Browser Isolation (RBI).

In an embodiment, for privileged access of web applications that do not support SSO, the universal privileged access management solution implements cloud-based software services including RBI, Zero Trust Network Access (ZTNA) and password vault.

In an embodiment, for privileged access of web applications that support SSO, the universal privileged access management solution implements cloud-based software services including Remote Browser Isolation (RBI) and ID brokers.

In the access authentication process, by leveraging the data loss prevention (DLP) feature of RBI, the actual access credentials for accessing web applications are not disclosed to the user for mitigating security risks.

BRIEF DESCRIPTION OF DRAWINGS

Embodiments of the invention are illustrated by way of example and not by way of limitation in the figures of the accompanying drawings in which references indicate similar elements. Note that references to "an" or "one" embodiment in this disclosure are not necessarily to the same embodiment, and such references mean "at least one."

FIG. 1 also shows a SAAS cloud 1-36 that hosts SAAS applications on Application Servers 1-37 as well as a private network 1-34 that hosts private applications on Application Servers 1-33.

DETAILED DESCRIPTION OF THE INVENTION

Figure 1:
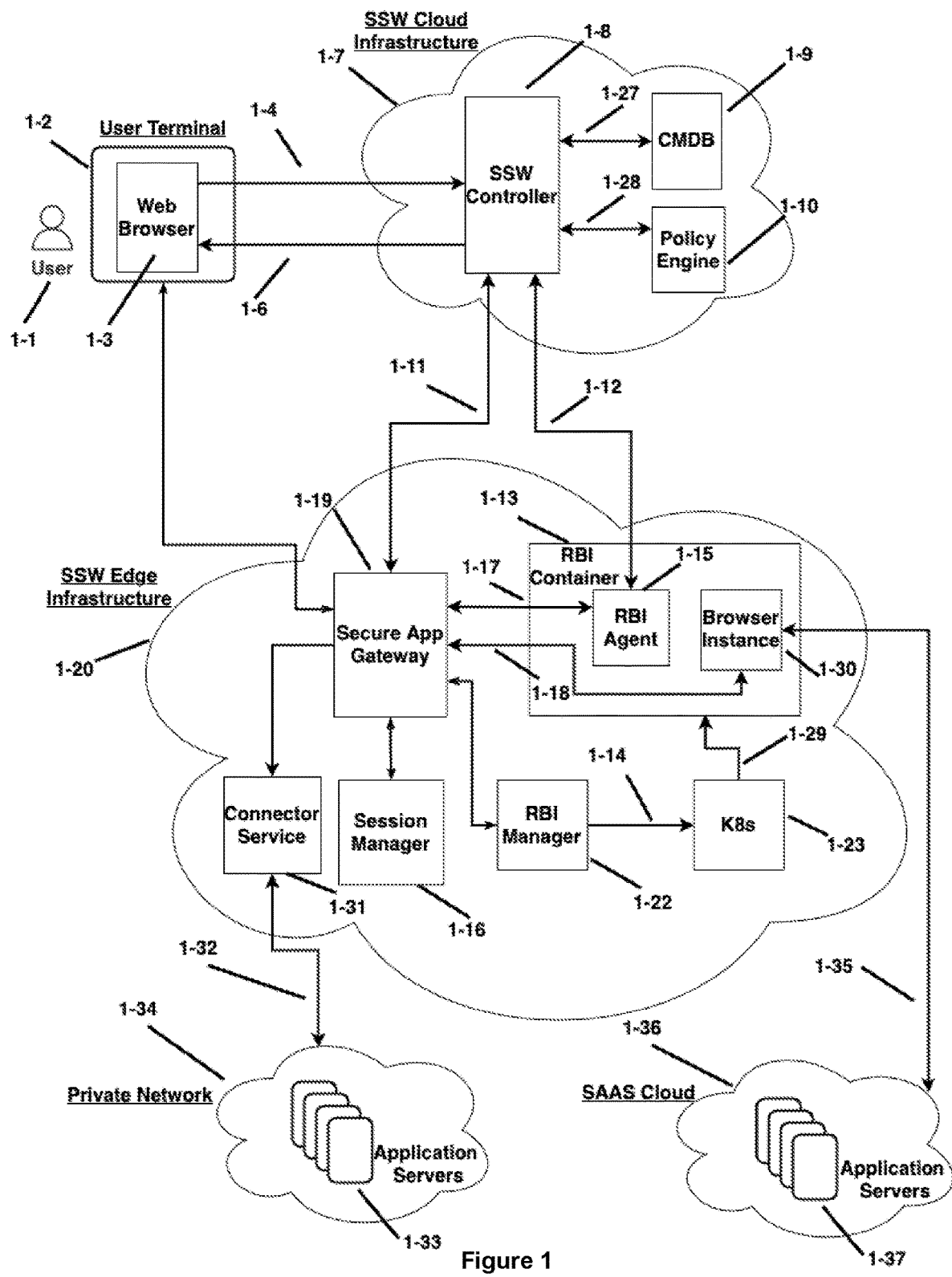
FIG. 1 is a block diagram that shows the key components of the embodiments of the invention, which includes Splashtop Secure Workspace (SSW) Cloud Infrastructure 1-7 and SSW Edge Infrastructure 1-20. SSW Cloud Infrastructure 1-7 consists of key software applications and services such as SSW Controller 1-8, Configuration Management Database (CMDB) 1-9, and Policy Engine 1-10. SSW Edge Infrastructure 1-20 consists of key software applications and services such as Secure App Gateway 1-19, Session Manager 1-16, RBI manager 1-22, Kubernetes Services (K8s) 1-23, RBI container 1-13, RBI Agent 1-15 and Browser Instance 1-30. The diagram shows possible communication among components via Application Program Interface (API) calls as well as data flows by lines with arrows.

In an embodiment, a universal privileged access management solution is implemented to enable users to securely share the access of web applications hosted in a SAAS cloud or a private network. FIG. 1 shows the key components of the embodiments of the invention.

SSW Cloud Infrastructure 1-7: A cloud infrastructure that hosts software applications and services for privileged access configuration and management. SSW Cloud Infrastructure 1-7 hosts the following key software applications and services:

SSW Controller 1-8: A software service that manages the session requests by performing security policy validation, access configuration coordination and user authentication. SSW Controller 1-8 communicates with Policy Engine 1-10 for zero-trust validation when an access request for a web application is received from a user's web browser. Once validated, SSW Controller 1-8 retrieves the corresponding access configuration including the access edge endpoint info from Configuration Management Database (CMDB) 1-9. The user's web browser uses the returned access configuration to connect to the web application via SSW Edge Infrastructure 1-20. In addition, SSW Controller 1-8 serves as a proxy in case that external Identity Provider (IdP) integration is needed and Single Sign-On (SSO) is supported to access the web applications.

Policy Engine 1-10: A software service that makes access decisions on a user's access request based on the access policies, e.g. endpoint security posture policies, application access policies, network policies, etc., provisioned by IT administrators.

CMDB 1-9: Configuration Management Database (CMDB) that is used to keep track of the state of assets such as products, systems, software, applications, facilities, etc., and the relationship between all assets. A CMDB helps IT administrators understand the relationship between the components of a system and to track their configurations such security policies.

SSW Edge Infrastructure 1-20: A cloud infrastructure that hosts software applications and services for providing privileged access to applications hosted in a SAAS cloud or a private network. SSW Edge Infrastructure 1-20 is deployed at a network edge close to users' geographical locations to ensure the control of users' secure access to software services and applications with minimized latency. SSW Edge Infrastructure 1-20 comprises the following key software applications and services:

Secure App Gateway 1-19: A software service that is responsible for data plane session management between a user's web browser to a web application by coordinating with RBI Manager 1-22, RBI Agent 1-15 and Browser Instance 1-30. Secure App Gateway 1-19 also coordinates with Session Manager 1-6 for live session monitoring, session control and recording.

RBI Manager 1-22: A software service that requests and manages RBI browser instances per requests from Secure App Gateway 1-19.

RBI Container 1-13: A virtual instance or cloud computing resource hosted in SSW Edge Infrastructure 1-20. RBI Container 1-13 provides a virtual computing environment for RBI Agent 1-5 and Browser Instance 1-30.

RBI Agent 1-15: A software service that is responsible for getting runtime context such as conditional access policy, cloud access security brokers (CASBs) policy, data loss prevention (DLP) policy and white/blacklist for Browser Instance 1-30. RBI Agent also renders the browser UI from Browser Instance 1-30 to the user's web browser via Secure App Gateway 1-19.

Browser Instance 1-30: A cloud browser that runs within the RBI Container 1-13 and interacts with a user for login authentication and connects to the web applications hosted in a SAAS cloud or a private network.

K8s 1-23: also known as Kubernetes, is an open-source system for automating deployment, scaling, and management of containerized applications. It is responsible for creating and managing RBI Container 1-13 per requests by RBI Manager 1-22.

Session Manager 1-16: A software service that manages the live session monitoring, session control and session recording.

Connector Service 1-31: A software service that establishes a secure tunnel connection between SSW Edge Infrastructure 1-20 and the private network 1-34. It relays the data communication between Secure App Gateway 1-19 and private applications on Application Servers 1-33 behind enterprise firewalls.

In an embodiment, a web link for a web application is created by a user to share with a third-party user. The web link is a Uniform Resource Locator (URL) that directs the third-party user to send the access request to SSW Controller 1-8.

In an embodiment, the shared URL link contains a unique ID that references to the access context information such as The name of the shared web application Usage limit, i.e., the number of accesses allowed Link expiration time Access policy Application account credentials Session recording option, i.e., enabling recording of the shared session or not Session monitoring option, i.e., enabling live session monitoring or not In an embodiment, a third-party user initiates the access request using the shared URL link. SSW controller 1-8 receives the access request, gathers the access context info, gets the assigned access policies, and then queries Policy Engine 1-10 to validate if the access request complies with the security policies.

In an embodiment, SSW controller 1-8 retrieves the access configuration such as the endpoint info of Secure App Gateway 1-19 from CMDB 1-9 after validating the access request with the Policy Engine 1-10. SSW controller 1-8 also constructs an access token based on the access context info associated with the access request.

In an embodiment, the third-party user's web browser is redirected to the Secure App Gateway 1-19 for requesting access to the shared web application as a reverse proxy. The access token as part of the access request contains access context info as well as the access entitlements the SSW controller 1-8 granted. The access token is used for subsequent RBI container creation as well as session establishment with the shared web application.

In an embodiment, RBI container 1-13 is created per the request of the RBI Manager 1-22 by coordinating with K8s 1-23. RBI manager 1-22 passes the RBI runtime context information to the RBI container 1-13 as environment parameters during the container creation and star process.

In an embodiment, RBI context runtime context includes (1) the request context with information such as the request IP address, entitlements, identity, operating system (OS), device, device posture etc. and (2) the application context with the configuration information of the remote browser such as resolution, allowed URLs, disallowed URLs, allow/disallow clipboard, session recording, live monitoring, etc. The entitlements in the request context are the attributes of the access token that SSW controller 1-8 grants the access to a web application for this RBI session. And the entitlements will be used for the exchange of other tokens used to authenticate to remote targets either via SSO or passwords.

In an embodiment, RBI container 1-13 contains Browser Instance 1-30 and RBI Agent 1-6. RBI Agent 1-15 obtains the runtime context such as conditional access policy, DLP policy and blacklist/whitelist from the environment configuration parameters of the RBI container 1-13. With the runtime context, RBI Agent 1-15 establishes a session with Secure App Gateway 1-19, which renders the browser instance 1-30's UI to the Web Browser 1-3 at the user terminal 1-2.

In an embodiment, Browser Instance 1-30 is a virtual instance running in the RBI container 1-13. It is augmented by the SSW browser extension for login autofill during the access request authentication process. The web application will be rendered in the RBI Browser Instance 1-30 to provide security protection. This prevents data such as actual access credentials from leaking to the end application users, and also isolates the untrusted endpoints from the remote target web application.

In an embodiment, in case of SAAS web applications, Browser Instance 1-30 sends the web application access request with the access token to SSW Controller 1-8. SSW Controller 1-8 responds with the list of privileged accounts that is associated with the access context by decoding the access token. Browser Instance 1-30 prompts the user to choose from the account list, and then initiates the access authentication with the SAAS application based on the user's account choice.

In an embodiment, in case of SAAS web applications, the actual access credentials of the privileged accounts are not disclosed to the user for mitigating the security risk, and are encoded in the access token by SSW controller 1-8. The access token contains not only the entitlement of the app access but also the target account reference that the user has chosen. The access token generated by SSW controller 1-8 will be used for authentication with the SAAS web application. The access authentication process follows the standard authentication protocols such as Security Assertion Markup Language (SAML) and OpenID Connect (OIDC).

In an embodiment, in this Single Sign-On (SSO) scenario, the SSW functions in the role of an Identity Provider (IDP), while the SAAS applications operate as a Service Provider (SP). On each side, SSO configurations are established to facilitate the IDP/SP coupling. Additionally, SSW Controller 1-8 is integrated with one or more IDPs for authentication and user provisioning. In such cases, SSW Controller 1-8 acts as an Identity Broker, serving as an SP to its integrated IDPs for SSW login and user provisioning.

In an embodiment, in case of private web applications, Browser Instance 1-30 sends the web application access request with the access token to Secure App Gateway 1-19. Through Connector Service 1-31, Secure App Gateway forwards the access request to the web application in the private network 1-34.

In an embodiment, in case of private web applications, SSW controller 1-8 redirects the access request to the secure app gateway 1-19 along with the access token. The secure app gateway 1-19 validates the access token and establishes the session using the application credentials.

In an embodiment, in case of private web applications, the actual access credentials for the private web application are not disclosed to the user for mitigating the security risk. A user is presented with a web form and prompted by the browser instance 1-30's extension to choose which account to use to log into the web application. After the user's selection, a one-time placeholder user ID and a time-based one-time password (TOTP) are dynamically generated and auto filled in the web form. After the user submits the login request, the secure app gateway 1-19 replaces the placeholder user ID and the TOTP with the actual login credentials and establishes the session with the web application. With this method, the actual login credentials for the web application are not disclosed to the user.

In another embodiment, in case of private web applications, the actual access credentials for the private web application are not disclosed to the user by leveraging the data loss prevention (DLP) feature of RBI browser instance 1-30. A user is presented with a web form and prompted by the browser instance 1-30's extension to choose which account to use to log into the web application. After user's selection, The RBI browser instance 1-30's extension queries the actual access credentials from SSW controller 1-8. Since the RBI limits the user from directly controlling the browser instance and its extension, a user is not able to get (e.g., copy & paste) the actual access credentials from the RBI browser instance. With this method, the actual login credentials for the web application are not disclosed to the user as well.

In an embodiment, in case of private web applications, the access request is typically encapsulated in the payload of the Hypertext Transfer Protocol (HTTP). The access request may also be encapsulated in the payload of well-known Transport Layer Protocol (TCP) based client-server application protocols such as Remote Desktop Protocol (RDP), Secure SHell (SSH) and Virtual Network Computing (VNC).

Figure 2:
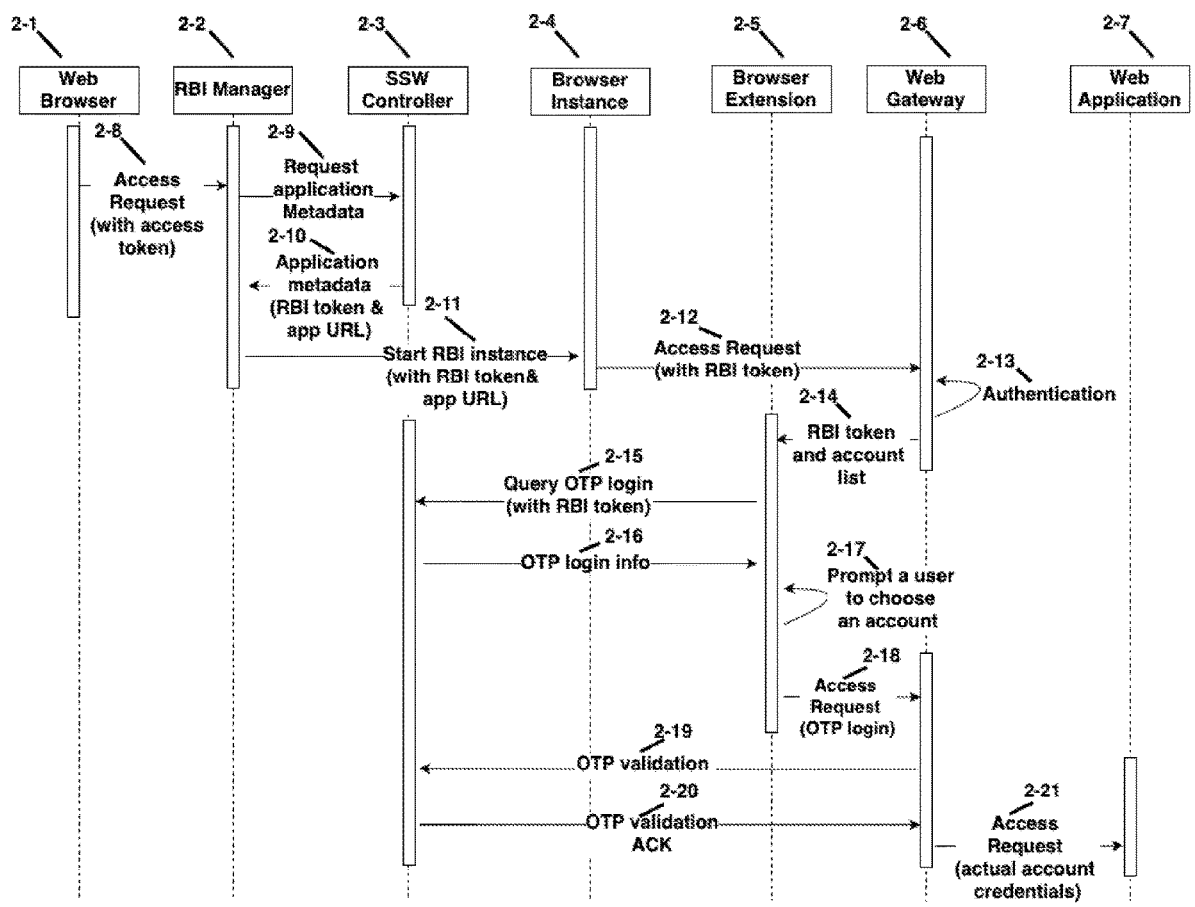
FIG. 2 is a diagram that shows an example process of sending an access request from a user's web browser to a web application hosted in a private network.

In an embodiment, as shown in FIG. 2, a user's Web Browser 2-1 sends an Access Request 2-8 to a Web Application 2-7 hosted in a private network. The Access Request 2-8 contains an access token that has been created based on the access context for accessing the web application.

In an embodiment, RBI Manager 2-2 requests the web application's metadata (via message 2-9) from SSW Controller 2-3 in order to start an RBI Browser Instance. The application's metadata includes a URL that points to the application's fully qualified domain name (FQDN) and an RBI token for authentication. Once obtaining the application's metadata (via message 2-10), the RBI manager 2-3 requests to create an RBI container via message Start RBI Instance 2-11. A Browser Instance 2-4 is then started as the part of the RBI container creation process. The Browser Instance 2-4 is configured to initiate the access authentication process with the Web Application 2-7 via Web Gateway 2-6.

In an embodiment, the Browser Instance 2-4 sends an Access Request 2-12 together with the RBI token, which contains the assigned privileged accounts info of the web applications for the user. The account information is a list of ID and name pairs. The Web Gateway 2-6 establishes a session with the Browser Instance 2-4 once the request is authenticated based on the RBI token.

In an embodiment, the Web Gateway 2-6 communicates the RBI token and the privileged account list via message 2-14 to Browser Extension 2-5 of the Browser Instance 2-4. The Browser Extension 2-5 then queries SSW Controller 2-3 to retrieve a list of name and Time-based One-Time Password (TOTP) code pairs. Based on the response of TOTP secret info 2-16 from the SSW Controller 2-3, the Browser Extension 2-5 presents a web form and prompts the user to choose an account to log in. Next, the Browser Extension 2-5 fills the web form automatically with the TOTP login name and password based on the user's account choice. This provides the data loss prevention (DLP) since the auto filled TOTP login name and password are not actual account credentials for the web application.

In an embodiment, the Web Gateway 2-6 associates the access request 2-18 with the previously established session with the Browser Instance 2-4, and checks if the TOTP secret information is valid by querying the SSW Controller 2-3 via message 2-19. After successful validation as acknowledged (via message 2-20) by SSW Controller 2-3, the Web Gateway 2-6 replaces the TOTP secret with the corresponding actual account credentials and sends the Access Request 2-21 to the Web Application 2-19.

In another embodiment, the SSW controller 2-3 creates a token that contains the TOTP login information when providing the TOTP secret information to the Browser Extension 2-5. In this case, the Web Gateway 2-6 does not need to query SSW Controller 2-3 for TOTP validation. Instead, the token created by the SSW controller 2-3 can be used for TOTP generation and validation.

What is claimed is:

1. A method for providing privileged access to web applications, the method comprising:
creating a first universal resource locator link and a first access token for accessing a web application;
receiving an access request associated with the first universal resource locator link and the first access token;
obtaining access context associated with the first universal resource locator link; determining if the access context complies to security policies for accessing the web application;
in response to a determination that the access context complies to the security policies, creating a second universal resource locator link and a second access token for accessing the web application, the second access token being created based on the access context;
responding to the access request with the second universal resource locator link and the second access token.

2. The method of claim 1, wherein the first universal resource locator link is created by referencing the access context for accessing the web application.

3. The method of claim 1, wherein the second universal resource locator link redirects the access request to start a cloud browser instance to connect to the web application.

4. The method of claim 1, wherein the access context comprising one or more of: name of the web application; usage limit; link expiration time; access policy; application account credentials; session recording option; or session monitoring option.

5. A system for providing access control to enterprise applications comprising: one or more computers; and a computer-readable, non-transitory medium coupled to said one or more computers having instructions stored thereon which, when executed by said one or more computers, cause said one or more computers to perform operations comprising: creating a first universal resource locator link and a first access token for accessing a web application; receiving an access request associated with the first universal resource locator link and the first access token; obtaining access context associated with the first universal resource locator link; determining if the access context complies to security policies for accessing the web application; in response to a determination that the access context complies to the security policies, creating a second universal resource locator link and a second access token for accessing the web application, the second access token being created based on the access context; responding to the access request with the second universal resource locator link and the second access token.

6. The system of claim 5, wherein the first universal resource locator link is created by referencing the access context for accessing the web application.

7. The system of claim 5, wherein the second universal resource locator link redirects the access request to start a cloud browser instance to connect to the web application.

8. The system of claim 5, wherein the access context comprising one or more of: name of the web application; usage limit; link expiration time; access policy; application account credentials; session recording option; or session monitoring option.

* * * * *